United States Patent [19]

Aoki et al.

[11] Patent Number: 4,890,899
[45] Date of Patent: Jan. 2, 1990

[54] COLOR SEPARATION OPTICAL SYSTEM WHICH UTILIZES GLASS FRIT FOR BONDING

[75] Inventors: Shinichiro Aoki, Kawasaki; Koichi Kawata, Tokyo; Yasuyuki Morita, Yokohama; Akitoshi Mori, Kawasaki; Yuji Hashidate, Tokyo; Tatsuki Tsukada, Yokohama; Hiroshi Nakamura, Kawasaki, all of Japan

[73] Assignee: Matsushita Electric Industrial Co., Ltd., Osaka, Japan

[21] Appl. No.: 193,614

[22] Filed: May 13, 1988

[30] Foreign Application Priority Data

May 18, 1987 [JP] Japan .................................. 62-120469
May 18, 1987 [JP] Japan .................................. 62-120471
May 18, 1987 [JP] Japan .................................. 62-120472
May 29, 1987 [JP] Japan .................................. 62-135232

[51] Int. Cl.$^4$ .......................... G02B 27/14; G02B 5/04
[52] U.S. Cl. ...................................... 350/173; 350/286
[58] Field of Search ............... 350/287, 286, 173, 417, 350/320; 358/55, 225, 250

[56] References Cited

U.S. PATENT DOCUMENTS

Re. 30,513  2/1981  Bleukens et al. ..................... 350/173
4,784,469  11/1988  Tsukada et al. ..................... 350/287

Primary Examiner—Bruce Y. Arnold
Assistant Examiner—Ronald M. Kachmarik
Attorney, Agent, or Firm—Pollock, VandeSande & Priddy

[57] ABSTRACT

A color separation optical system includes a set of prisms which separate incident light into components having different wavelengths. Image pickup devices may be exposed to the separated light components. An arrangement prevents or reduces the influence of a temperature variation upon color separation characteristics. The color separation optical system maybe manufactured in a new way.

2 Claims, 6 Drawing Sheets

FIG. 19
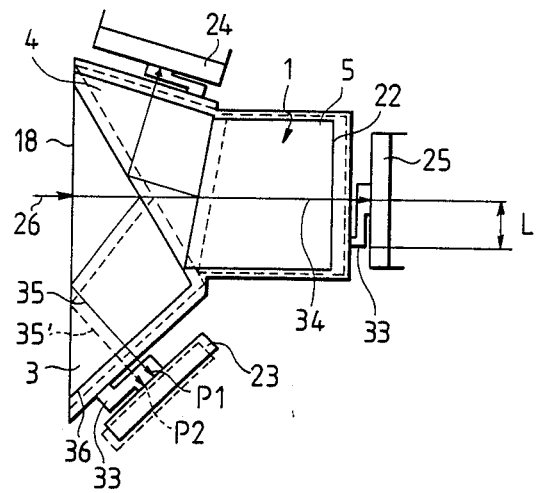
FIG. 20
FIG. 21
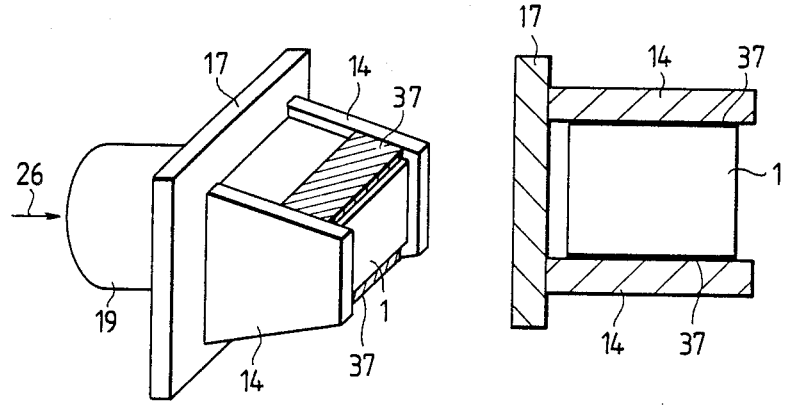

COLOR SEPARATION OPTICAL SYSTEM WHICH UTILIZES GLASS FRIT FOR BONDING

BACKGROUND OF THE INVENTION

This invention relates to an optical system for color separation and a method of manufacturing the optical system.

Optical systems for color separation are used in color television cameras. A typical color separation optical system includes an arrangement of prisms separating incident light into a plurality of colors of lights. In such a color separation optical system, temperature variations cause expansion and contraction of parts, shifting light paths. The shifts of the light paths degrade the registration between component color images derived via a camera using the color separation optical system. The degradation in the registration lowers the resolving power of a composite image.

SUMMARY OF THE INVENTION

It is an object of this invention to provide a color separation optical system which is less dependent on a temperature variation than available heretofore.

It is another object of this invention to provide a method of a color separation optical system less dependent on a temperature variation than available heretofore.

A first color separation optical system of this invention includes a set of first, second, and third prisms separating incident light into components having different wavelengths. A gap extends between the first and second prisms. The first, second, and third prisms are bonded by means of glass.

A second color separation optical system of this invention includes a set of prisms separating incident light into components having different wavelengths. The prisms have respective surfaces extending in a common flat plane. Adhesive bonds the surfaces of the prisms to a base.

A third color separation optical system of this invention includes a set of prisms separating incident light into components having different wavelengths. Adhesive bonds respective surfaces of the prisms to a base. Projections extend from the base and contact the surfaces of the prisms. The projections are variable in height relative to the base.

A fourth color separation optical system of this invention includes a base and a set of prisms separating incident light into components having different wavelengths. The prism set is fixed to the base. The prisms are made of silica glass. The base is made of quartz-like material Invar T.M.

A fifth color separation optical system of this invention includes a set of prisms separating incident light into components having different wavelengths. The prism set is fixed to a base. Image pickup devices are exposed to the respective light components. The image pickup devices are bonded to the prism set. A relationship between optical positions of the image pickup devices and an optical position of the prism set is kept independent of a thermal deformation of the prism set.

A sixth color separation optical system of this invention includes a main base and a pair of prism bases fixed to the main base. A prism set is supported between the prism bases. A connection plate fixedly extends between the prism bases and supports the prism set.

A first method of manufacturing a color separation optical system according to this invention includes the steps of placing a first prism in glass frit suspension and settling glass frit on the first prism, heating the settled glass frit and thereby forming a glass film on the first prism, opposing the first prism and a second prism and locating the glass film between the first and second prisms, and melting the glass film to bond the first and second prisms.

A second method of manufacturing a color separation optical system according to this invention includes the steps of forming a glass film on a first prism in a sputtering process, opposing the first prism and a second prism and locating the glass film between the first and second prisms, and melting the glass film to bond the first and second prisms.

A third method of manufacturing a color separation optical system according to this invention includes the steps of assembling prisms into a prism set, processing the prism set and forming respective surfaces of the prisms which extend in a common flat plane, and bonding the surfaces of the prisms to a base.

BRIEF DESCRIPTION OF THE DRAWINGS

FIG. 19 is a plan view of a color separation optical system according to a fourth embodiment of this invention.

FIG. 20 is a perspective view of a color separation optical system according to a fifth embodiment of this invention.

FIG. 21 is a sectional view of a color separation optical system in a modification of the fifth embodiment.

DESCRIPTION OF THE FIRST PREFERRED EMBODIMENT

Figure 1:
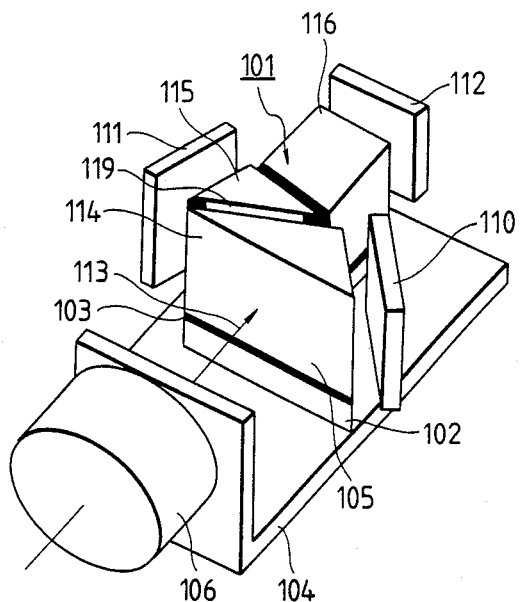
FIG. 1 is a perspective view of a color separation optical system according to a first embodiment of this invention.
Figure 2:
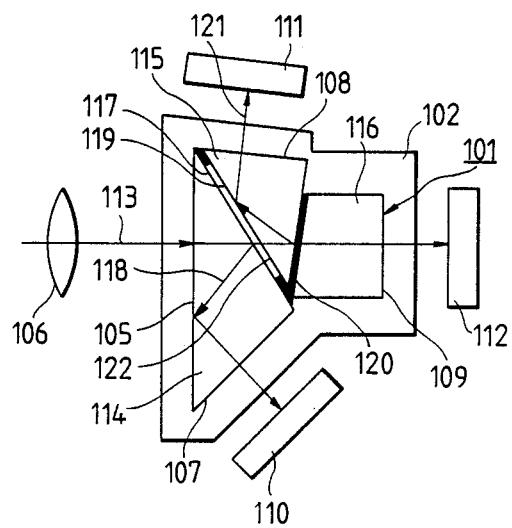
FIG. 2 is a plan view of the optical system of FIG. 1.

With reference to FIGS. 1 and 2, a color separation optical system according to a first embodiment of this invention includes a set 101 of prisms 114, 115, and 116 mounted on a base 102. After the prisms 114-116 are located in optically suitable positions on the base 102, they are fixed to the base 102. The base 102 is attached to a frame 104 of a color television camera.

A lens 106 supported on the camera frame 104 extends in front of an inlet face 105 of the prism set 101 which extends on the first prism 114. Solid image pickup devices or image pickup tubes 110, 111, and 112 follow outlet faces 107, 108, and 109 of the prism set 101 along directions of travel of lights respectively. The outlet faces 107, 108, and 109 extends on the first, second, and third prism 114, 115, and 116 respectively.

After passing through the lens 106, incident light 113 enters the first prism 114 within the prism set 101 via the inlet face 105. The incident light 113 travels through the first prism 114 and reaches a dichroic film 117 extending between the first and second prisms 114 and 115.

A blue component of the incident light 113 is reflected by the dichroic film 117 and forms a reflected blue light 118. Red and green components of the incident light 113 pass through the dichroic film 117 and enter the second prism 115 via a small gap 119 defined between the first and second prisms 114 and 115. Generally, the thickness of the gap 119 is around 20 micrometers. The reflected blue light 118 moves through the first prism 114 while undergoing total reflection at the inlet face 105. After moving from the first prism 114 via the outlet face 107, the blue light 118 enters the image pickup device 110. The image pickup device 110 converts the blue light 118 into a corresponding electric signal which represents a blue component of an image.

The red and green components of the light travel through the second prism 115 and reaches a dichroic film 120 extending between the second and third prisms 115 and 116. The red component of the light is reflected by the dichroic film 120 and forms a reflected red light 121. The green component of the light passes through the dichroic film 120 and enters the third prism 116. The reflected red light 121 moves through the second prism 115 while undergoing total reflection at a front face 122 of the second prism 115. After moving from the second prism 115 via the outlet face 108, the red light 121 enters the image pickup device 111. The image pickup device 111 converts the red light 121 into a corresponding electric signal which represents a red component of the image.

The green component of the light travels through the third prism 116 and then moves from the third prism 116 via the outlet face 109. After moving from the third prism 116, the green light enters the image pickup device 112. The image pickup device 112 converts the green light into a corresponding electric signal which represents a green component of the image.

Output signals from the image pickup devices 110–112 are combined into a composite color video signal, from which a composite color image is derived.

Figure 3:
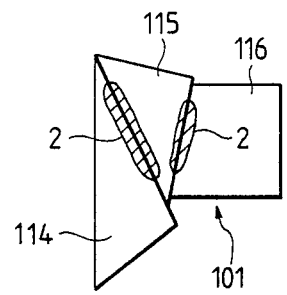
FIG. 3 is a plan view of the prisms of FIGS. 1 and 2.

As shown in FIG. 3, bonding or adhesive members 2 including glass with a low melting point are placed over or applied to the regions at and around the boundaries between the prisms 114–116 after the prisms 114–116 are fixed in given positions. The prism set 101 including the glass members 2 is heated to a temperature above the melting point of the glass members 2 but below a melting point of material forming the prisms 114–116. As a result, the glass members 2 melt. Then, the prism set 101 including the glass members 2 is cooled so that the glass members 2 20 harden and the prisms 114–116 are bonded by the hard glass members 2.

The glass members 2 may be composed of lead glass frit suspended in pure water and having a melting point of about 530° C. Since the material forming the prisms 114–116 has a melting or softening point of about 700° C., the surfaces of the prisms 114–116 maintain accuracies during and after the heating process bonding the prisms 114–116.

Figure 4:
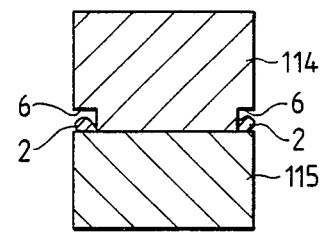
FIGS. 4-8 are sectional views of prisms in modifications of the first embodiment.

As shown in FIG. 4, the prism 114 may be formed with cuts or recesses 6 into which the glass members 2 are placed before the heating process.

Figure 5:
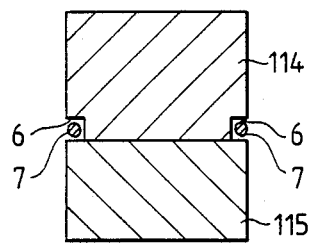

As shown in FIG. 5, the glass members 2 of FIG. 4 may be replaced by glass sticks 7 having a low melting point. Since the glass sticks 7 have a higher glass density than that of the glass suspension, the glass sticks 7 allow the bonding between the prisms 114 and 115 to be easier.

It should be noted that the gap 119 (see FIGS. 1 and 2) between the prisms 114 and 115 may be removed as shown in FIGS. 3–5.

Figure 6:
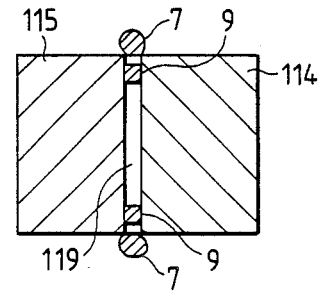

As shown in FIG. 6, spacers 9 are placed between the prisms 114 and 115 to provide the gap 119. Glass sticks 7 having a low melting point are placed at the boundary between the prisms 114 and 115 so that the glass sticks 7 extend along edges of the gap 119. Then, the prisms 114 and 115, and the glass sticks 7 are heated to bond the prisms 114 and 115. During the heating process, the melted glasses 7 enter the edges of the gap 119 in a capillary phenomenon. The portions of the glasses 7 moved into the gap 119 enhance the strength of bonding between the prisms 114 and 115.

The spacers 9 are composed of metal films in given shapes formed through an etching process. The spacers 9 may be made of glass having a thermal expansion coefficient equal to that of the material forming the prisms 114 and 115.

Figure 7:
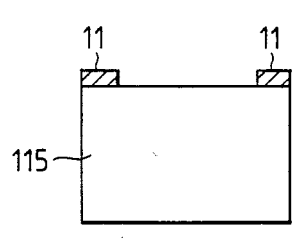

The spacers 9 may be formed as follows. A mask is placed over a portion of the surface of the prism 115 defining the gap 119. The prism 115 with the mask is placed into glass frit suspension. The prism 115 with the mask is held within the glass frit suspension for a predetermined time which allows films of glass frit with a desired thickness to be settled or formed on portions of the surface of the prism 115 exposed from the mask. After the prism 115 with the mask is removed from the glass frit suspension, the mask is taken off from the prism 115. Then, the prism 115 with the glass frit films is heated so that the glass frit films harden. As shown in FIG. 7, the hard glass frit films form glass films 11 corresponding to the spacers 9 of FIG. 6. The glass films 11 have a thickness corresponding to the thickness of the gap 119 (see FIGS. 1 and 2).

Figure 8:
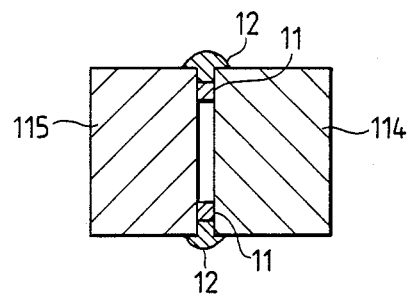

As shown in FIG. 8, the prism 115 with the glass films 11 are opposed to the prism 114, and the prisms 114 and 115 are bonded by glass members 12 in a heating and cooling process. The glass members 12 have a melting point lower than a melting or softening point of the glass films 11.

In order to facilitate the formation of the glass frit films, the prism 115 and the glass frit suspension may be placed in a container rotating at a high speed. In this case, the surface of the prism 115 to be provided with the glass frit films is set perpendicular to the axis of the rotation of the container.

In the case of a small gap 119, the glass films 11 may be formed by sputtering glass.

In experiments according to this invention, the glass material forming the prisms 114–116 had a refractive index of 1.55920, a thermal expansion coefficient of $78\times10^{-7}$ m/m°C, and a softening point of 647°C. "BPG2" produced by SUMITA OPTICAL GLASS MANUFACTURING COMPANY LIMITED was used as the glass material forming the prisms 114–116. The material forming the bonding glass members and having a low melting point was lead glass frit having a transition point ($10^{13.3}$ poise) of 408° C., a softening point ($10^{7.6}$ poise) of 480° C., and a working point ($10^4$ poise) of 575° C. The prisms 114–116 were bonded at a temperature of 530° C.

Figure 9:
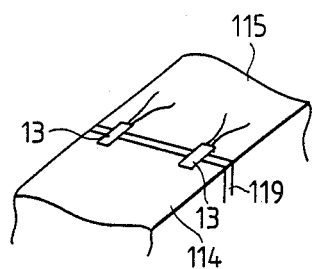
FIG. 9 is a perspective view of a portion of the optical system of FIGS. 1 and 2 which is being exposed to displacement measuring experiment.
Figure 10:
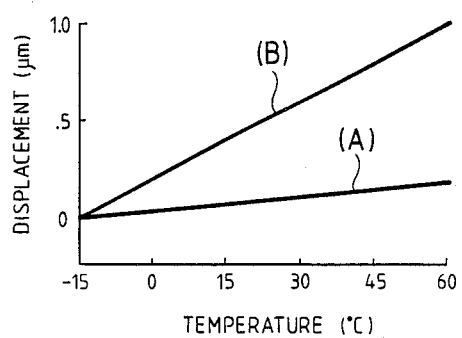
FIG. 10 is a graph showing the relationship between displacement and temperature.

As shown in FIG. 9, strain gauges 13 were attached to both the prisms 114 and 115 and were located across the gap 119 having a thickness of 20 micrometers. As shown by the line (A) of FIG. 10, the measured displacement was about 0.2 micrometer with respect to a variation of temperature between −15° C. and 60° C. The overall shift of the registration with respect to this temperature variation was equal to or greater than ±1 micrometer.

In order to evaluate an advantage of this embodiment, similar experiments were performed on a structure where the prisms 114 and 115 were bonded by epoxy adhesive. In this structure, as shown by the line (B) of FIG. 10, the measured displacement was about 1.0 micrometer with respect to a variation of temperature between −15° C. and 60° C. In this case, the overall shift of the registration with respect to this temperature variation was equal to or greater than ±1 micrometer.

DESCRIPTION OF THE SECOND PREFERRED EMBODIMENT

Figure 11:
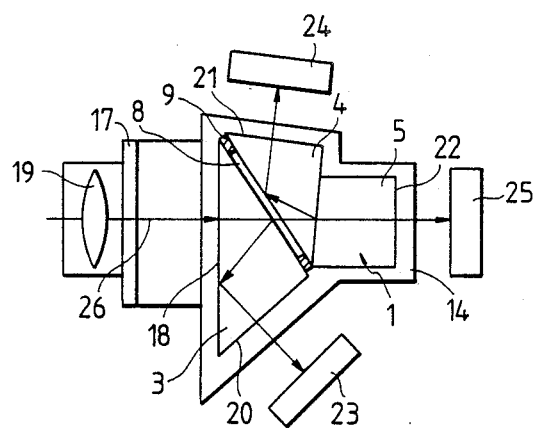
FIG. 11 is a plan view of a color separation optical system according to a second embodiment of this invention.
Figure 12:
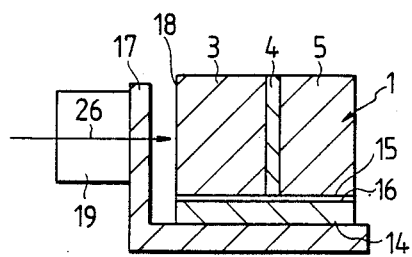
FIG. 12 is a sectional view of the optical system of FIG. 11.

With reference to FIGS. 11 and 12, a color separation optical system according to a second embodiment of this invention includes a set 1 of prisms 3, 4, and 5 mounted on a prism base 14. Spacers 9 separate the prisms 3 and 4 by a small gap 8. Bottom surfaces 15 of the prisms 3–5 extend in a common flat plane and are bonded to a flat upper surface of the prism base 14 by means of adhesive 16.

The prism base 14 is fixed to a base plate 17 of a color television camera. A lens 19 supported on the camera base plate 17 extends in front of an inlet face 18 of the prism set 1. The prism set 1 has outlet faces 20, 21, and 22 followed by image pickup tubes or solid image pickup devices 23, 24, and 25 respectively.

Incident light 26 enters the prism set 1 via the lens 19. The incident light 26 is separated by the prism set 1 into color components applied to the image pickup devices 23–25 respectively.

Since the bottom surfaces 15 of the prism set 1 extend in a common flat plane, the bottom surfaces 15 of the prism set 1 are closely bonded to the prism base 14 and the thickness of the adhesive 16 is uniform.

Figure 13:
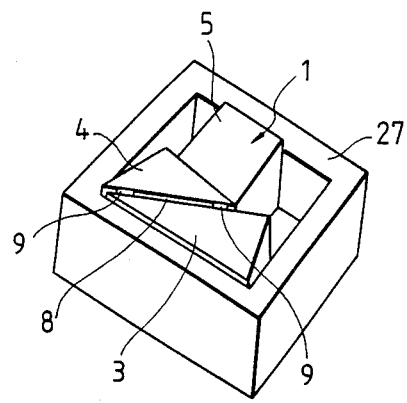
FIG. 13 is a perspective view of the prism set in the second embodiment during a manufacturing process.

The color separation optical system is manufactured as follows. As shown in FIG. 13, the spacers 9 are placed between the prisms 3 and 4 to form the gap 8. The prisms 4 and 5 are bonded together by means of adhesive such as resin adhesive. Light passing faces of the prisms 3–5 are used as references during the relative positioning of the prisms 3–5. The prism set 1 is placed into a support frame 27. Then, bottom surfaces 15 of the prism set 1 are processed by a suitable machine such as a grinder to form a common flat plane. After the processed bottom surfaces 15 of the prism set 1 are bonded to the prism base 14 by means of the adhesive 16, the support frame 27 is removed.

Even in cases where the temperature of the color separation optical system varies, since the flat surfaces 15 of the prism set 1 are bonded to the flat surface of the prism base 14 by means of the adhesive 16 of a uniform thickness, stresses occur uniformly at the bonded surfaces 15 and thus independent displacements of the prisms 3–5 are prevented or reduced. Accordingly, it is possible to prevent or reduce a shift of the registration with respect to a temperature variation.

Figures 14, 15:
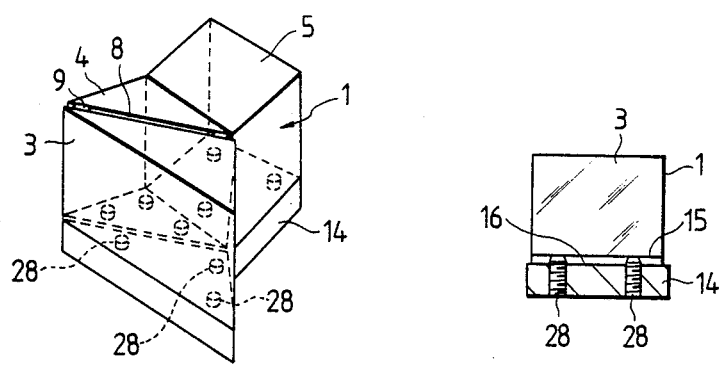
FIG. 14 is a perspective view of a prism set and a prism base in a modification of the second embodiment.
FIG. 15 is a sectional view of the prism set and the prism base of FIG. 14.

As shown in FIGS. 14 and 15, the prism base 14 may be provided with screws 28. Upper ends of the screws 28 are in contact with the bottom surfaces 15 of the prism set 1 so that the prism set 1 is supported on the screws 28. Three screws 28 are provided for each of the prisms 3–5 and are positioned at the vertexes of a triangle. The number of screws 28 for each prism may be different from three. The screws 28 are movable vertically relative to the prism base 14 so that the positions of the prisms 3–5 are adjustable via the screws 28. Even in cases where the temperature of the color separation optical system varies, since each of the flat surfaces 15 of the prism set 1 is supported at the triangle vertexes by the three screws 28, stresses occur uniformly at the bonded surfaces 15 and thus independent displacements of the prisms 3–5 are prevented or reduced. Accordingly, it is possible to prevent or reduce a shift of the registration with respect to a temperature variation. It should be noted that the prism set 1 may be fixedly sandwiched by a pair of prism bases. In addition, the prisms 3–5 may be bonded together at incident light passing faces thereof to increase the stability of the color separation optical system against a temperature variation.

DESCRIPTION OF THE THIRD PREFERRED EMBODIMENT

Figure 16:
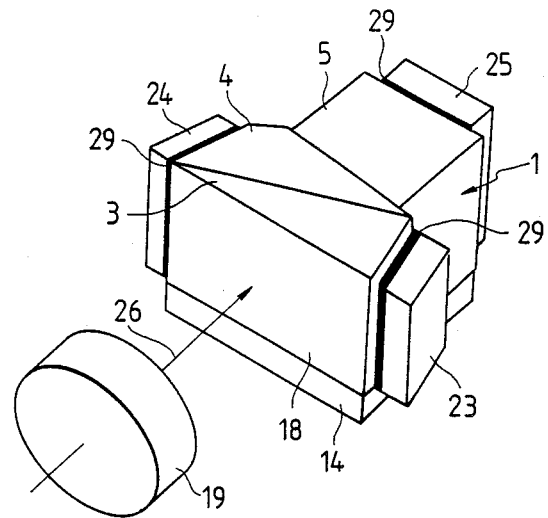
FIG. 16 is a perspective view of a color separation optical system according to a third embodiment of this invention.
Figure 17:
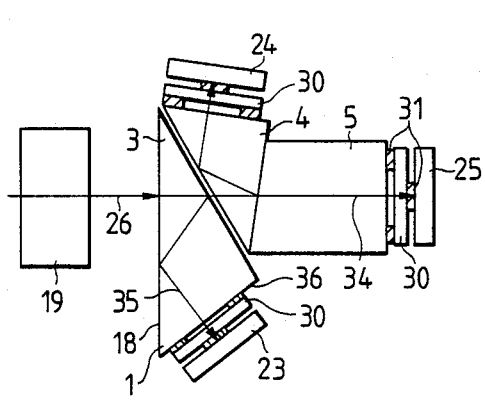
FIG. 17 is a plan view of a color separation optical system in a modification of the third embodiment.

With reference to FIGS. 16 and 17, a color separation optical system according to a third embodiment of this invention includes a set 1 of prisms 3, 4, and 5 mounted on a prism base 14. A lens 19 is located in front of an inlet face 18 of the prism set 1. The prism set 1 has outlet faces followed by image pickup tubes or solid image pickup devices 23, 24, and 25 respectively. The image pickup devices 23–25 are attached to the prisms 3–5 by means of fixing members 29. Incident light 26 enters the prism set 1 via the lens 19. The incident light 26 is separated by the prism set 1 into color components applied to the image pickup devices 23–25 respectively.

The prisms 3–5 are made of glass, such as silica glass, having a small expansion coefficient. The prism base 14 is made of material, such as the quartz-like material Invar T.M. having a small expansion coefficient. The use of the materials of small expansion coefficients for the prism set 1 and the prism base 14 reduce shifts of optical axes of outgoing lights from the prisms 3–5 with respect to a temperature variation.

The fixing members 29 are preferably made of material having a thermal expansion coefficient similar to those of the materials forming the prism set 1 and the prism base 14 in order to prevent thermally-induced strains.

Figure 18:
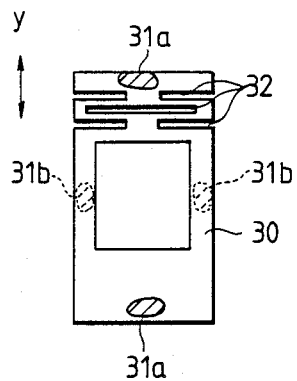
FIG. 18 is a front view of the plate of FIG. 17.

As shown in FIGS. 17 and 18, the fixing members 29 include plates 30 extending between the prisms 3–5 and the image pickup devices 23–25. The plates 30 are bonded to the prisms 3–5 or the prism base 14 by means of adhesive 31a and are also bonded to the image pickup devices 23–25 by means of adhesive 31b. The adhesive 31b extends on optical axes of outgoing lights from the prisms 3–5. As shown in FIG. 18, each plate 30 has grooves 32 which allow an elastic deformation of the plate 30 in a direction "y".

When the temperature of the color separation optical system varies and thus the plates 30 thermally expand or contract, the grooves 32 allow the plates 30 to deform elastically in the direction "y" so that the deformations of the plates 30 along the direction "y" are absorbed and compensated. In cases where the plates 30 are arranged with respect to the image pickup devices 23–25 in similar manners, it is possible to compensate relative displacements of the image pickup devices 23–25 with respect to a temperature variation so that a degradation in the registration can be reduced.

DESCRIPTION OF THE FOURTH PREFERRED EMBODIMENT

With reference to FIG. 19, a color separation optical system according to a fourth embodiment of this invention includes a set 1 of prisms 3, 4, and 5, and image pickup devices 23, 24, and 25 attached to the prisms 3, 4, and 5 via expansion absorbing plates 33 respectively.

Incident light 26 enters the prism set 1 via an inlet face 18 of the first prism 3. A first color component of the incident light 26 passes through the prisms 3–5 as transmitted light 34 and enters the image pickup device 25. Other color components of the incident light 26 will be described hereinafter on the basis of the transmitted light 34.

A second color component of the incident light 26 is reflected by the boundary between the prisms 3 and 4, forming a reflected light 35 which is reflected again by the inlet face 18 and which moves from an outlet face 36 of the prism 3 into a position P1 of the image pickup device 23. When thermal expansion or contraction occurs, the path of the reflected light 35 moves to a line 35' and the reflected light enters a position P2 of the image pickup device 23. An effective length L and a thermal expansion coefficient of the expansion absorbing plate 33 are chosen so that the center of the image pickup device 23 will move to the position P2 in response to the thermal expansion or contraction. Accordingly, the image pickup device 23 remains in a fixed positional relationship with the reflected light 35 independent of the thermal expansion or contraction. A third color component of the incident light 26 is reflected at the boundary between the prisms 4 and 5, entering the image pickup device 24. Similarly, the expansion absorbing plate 33 associated with the image pickup device 24 is designed so that the image pickup device 24 remains in a fixed relationship with the light reflected at the boundary between the prisms 4 and 5.

In this way, the positional relationship between the optical axes of the lights incident to the image pickup devices 23–25 remains constant independent of the thermal expansion or contraction so that an accurate registration and a high resolution can be maintained with respect to a temperature variation.

It should be noted that the expansion absorbing plates 33 may be bonded to a prism base carrying the prism set 1.

DESCRIPTION OF THE FIFTH PREFERRED EMBODIMENT

With reference to FIG. 20, a color separation optical system according to a fifth embodiment of this invention includes a set 1 of prisms mounted between prism bases plate 14. The prism bases 14 are attached to a main base 17. Connection members 37 fixedly extend between the prism base 14. The prism set 1 is also supported between the connection members 37. A lens 19 attached to the main base plate 17 extends in front of the prism set 1.

Since the prism set 1 is fixed between the two prism bases 14, the prism set 1 undergoes equal effects of thermal expansion or contraction from the two prism bases 14 and thus a thermal displacement of the prism set 1 relative to the lens 19 can be reduced.

It is preferable that the prism bases 14, the prism set 1, the connection members 37, and the main base plate 17 have similar thermal expansion coefficients to allow the color separation optical system to be reliably independent of a temperature variation.

As shown in FIG. 21, the connection members 37 may fix the prism set 1 to the respective prism bases 14.

What is claimed is:

1. A color separation optical system comprising:
   (a) a set of first, second, and third prisms separating incident light into components having different wavelengths, a gap extending between the first and second prisms;
   (b) and means for bonding the first, second, and third prisms, the bonding means comprising glass frit.

2. The optical system of claim 1 wherein opposing surfaces of the prisms have at least one cut in which the glass frit is placed.

* * * * *